May 6, 1952 K. H. SWART 2,595,904
TRICONE ROCK BIT
Filed May 6, 1948
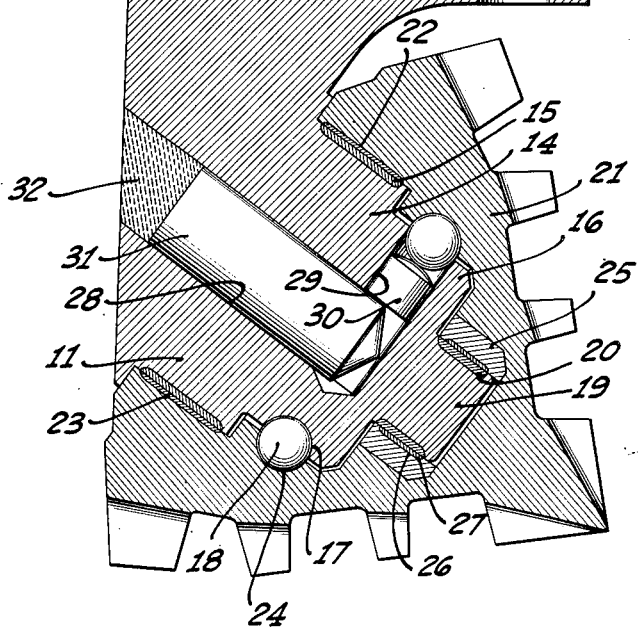
INVENTOR.
KENNETH H. SWART,
BY Hazard & Miller
ATTORNEYS.

Patented May 6, 1952

2,595,904

UNITED STATES PATENT OFFICE 2,595,904

TRICONE ROCK BIT

Kenneth H. Swart, Whittier, Calif., assignor to Security Engineering Co., Inc., Whittier, Calif., a corporation of California Application May 6, 1948, Serial No. 25,455

1 Claim. (Cl. 308—8.2)

This invention relates to improvements in rock bits used in drilling wells and particularly to that type of rock bit popularly referred to as a tri-cone bit.

An object of the invention is to provide an improved rock bit of this character wherein the radial bearings designed to carry the radial loads imposed on the cutters are formed of relatively hard metal and wherein the hard metal forming the inner part of the radial bearings is mounted directly on the journal for the cutter. In the conventional tri-cone rock bit, the radial bearings heretofore have generally been formed of rollers. However, recent technological advances in well drilling practice require the imposition on the bit of extremely heavy weights and when these weights have been imposed and the drill stem on which the bit is mounted is rotated at a relatively high speed the conventional roller bearings have not proven satisfactory in carrying the heavy radial loads imposed thereon. Consequently, with the conventional bit employing roller radial bearings it has generally been necessary to restrict the rotary speed of the drill stem to 40 to 50 revolutions per minute when such weights as 50,000 pounds are imposed on an 8¾ inch bit. The improved bit by using hard metal as distinguished from rollers enables much heavier loads to be imposed and the drill stem to be rotated at much higher speeds and is still capable of carrying the radial loads imposed on the cutters under these circumstances. The present invention is characterized by the fact that the inner radial bearing has the inner part thereof formed by hard metal deposited as by welding on the inner end of the journal itself. The opposed outer part of the radial bearing is preferably provided by a ring which is pressed or otherwise firmly secured within the cutter. The ring may either be entirely formed of hard metal or may be of a relatively soft steel ring having the hard metal deposited as by welding on its interior.

With the foregoing and other objects in view, which will be made manifest in the following detailed description and specifically pointed out in the appended claim, reference is had to the accompanying drawings for an illustrative embodiment of the invention, wherein:

Fig. 1 is a sectional view through one shank element of a tri-cone bit embodying the present invention; and Fig. 2 is a partial sectional view similar to Fig. 1 but illustrating an alternative form of construction.

Referring to the accompanying drawings wherein similar reference characters designate similar parts throughout, 10 indicates a shank element of a tri-cone bit which in conformity with conventional practice is assembled with two other counter parts to form the complete bit. Each shank element has integral therewith a journal 11 and is internally concaved as indicated at 12 to provide for the conducting of circulation fluid to discharge ports 13. The journal 11 has three steps thereon, the outer step which is of the maximum diameter being indicated at 14 and being grooved. This groove is filled with hard metal 15 deposited therein as by welding. The intermediate step which is of an intermediate diameter and indicated at 16 is externally grooved to provide a ball race 17 for balls 18. The innermost and smallest step on the journal indicated at 19 is grooved and the groove is filled with hard metal 20 deposited therein as by welding. A toothed cutter of generally conical shape indicated at 21 is applicable to the journal and is internally stepped in a manner complementary to the steps on the journal. The outer side of the cutter is internally grooved as at 22 and the groove filled with hard metal 23 deposited as by welding. A ball race 24 is formed on the interior of the cutter for the balls 18 and the inner end of the cutter is somewhat enlarged around the inner step 19 of the journal to receive a ring 25. In the construction shown in Fig. 1 this ring may be formed of relatively soft steel and is internally grooved as at 26. This groove is filled with hard metal 27. An axial bore 28 is formed in the journal from the outer side of the shank and terminates near the plane of the balls 18. A radial bore 29 provides communication between the bore 28 and the ball race 17.

In assembling the cutter and the shank the cutter with the ring 25 pressed therein is merely slipped onto the journal and the balls 18 are fed into the space between the races through the bores 28 and 29. Thereafter a plug 30 is positioned in the bore 29 to prevent egress of the balls from the races. This plug is retained in position by means of a pin 31 that is driven into the bore 28 and locked therein by means of weld metal 32.

The hard metals employed for the radial bearings may be of the character generally used for hard surfacing such as Stellite or Stoodite, these metals preferably having hardness in the neighborhood of 60 on the "C" scale of the Rockwell hardness testing machine. While it is not essential, the two hard metals that oppose each other in either of the radial bearings are preferably slightly different from each other and may be slightly of different hardnesses so as to have unlike metals rubbing against each other in conformity with movement friction bearing practice.

In the construction shown in Fig. 2 the construction is the same as that previously described except that the ring 25a instead of being formed partially of relatively soft steel and partially of hard metal is formed entirely of hard metal and is pressed or otherwise firmly secured within the cutter.

In both of these constructions it will be appreciated that the inner element of the friction type bearing forming the inner radial bearing is deposited as by welding on the inner end of the journal itself so as to be rendered integral therewith. The corresponding outer element of the inner radial bearing is provided by a ring pressed into the cutter. The use of such a ring is preferable due to the limited space in the inner end of the cutter which renders the depositing of hard metal on the interior of the cutter difficult. In the case of the outer radial bearing there is usually sufficient space within the cutter to enable the outer hard metal 23 to be deposited directly to the interior of the cutter. However, with the inner radial bearing the space is so limited that it is advisable to provide a ring 25 within which the hard metal 27 is deposited or to form the entire ring of hard metal as illustrated in Fig. 2. The fact that the ring 25 is open ended facilitates the depositing of the hard metal on its interior.

When the hard metal has been deposited on the journal, on the interior of the cutter or on the interior of the ring it may then be ground so as to present a smooth bearing surface to the corresponding element of the radial bearing.

From the above described construction it will be appreciated that an improved tri-cone rock bit has been provided which can be easily manufactured and assembled. This type of rock bit is capable of adequately carrying very heavy drill stem weights at relatively high speeds which are incapable of being carried with conventional roller radial bearings.

In rock bits of this type as the axial loads or thrust loads are usually relatively small the use of balls to carry the thrust load and to lock the cutter onto the journal is generally adequate.

Various changes may be made in the details of construction without departing from the spirit and scope of the invention as defined by the appended claim.

I claim:

A rock bit comprising a shank having a journal presenting an outer portion of maximum diameter, an intermediate portion of intermediate diameter, and an inner portion of minimum diameter, a cutter rotatable on the journal and enclosing the same, the outer and inner portions of the journal presenting annular surfaces of welded-on hard metal forming elements of outer and inner radial friction type bearings, a bushing in the cutter presenting an inner annular surface of hard metal opposed to the surface of the inner portion of the journal forming the other element of the inner radial bearing, the cutter having an annular layer of hard metal welded onto the interior thereof adjacent its outer end so as to be disposed opposite the hard metal on the outer end of the journal to form the other element of the outer radial bearing, ball races formed on the intermediate portion of the journal and on the cutter opposite thereto, and balls insertable through the journal between the ball races forming a thrust bearing between the radial bearings.

KENNETH H. SWART.

REFERENCES CITED

The following references are of record in the file of this patent:

UNITED STATES PATENTS

| Number | Name | Date |
| --- | --- | --- |
| 1,388,424 | George | Aug. 23, 1921 |
| 1,656,471 | Childs et al. | Jan. 17, 1928 |
| 1,747,394 | Scott | Feb. 18, 1930 |
| 1,885,266 | Johnson | Nov. 1, 1932 |
| 2,081,201 | Howard et al. | May 25, 1937 |
| 2,086,681 | Scott | July 13, 1937 |
| 2,098,758 | Reed | Nov. 9, 1937 |
| 2,184,129 | Stancliff | Dec. 19, 1939 |
| 2,192,697 | Scott | Mar. 5, 1940 |
| 2,339,161 | Fermier | Jan. 11, 1944 |
| 2,351,357 | Miller et al. | June 13, 1944 |